United States Patent Office 3,276,035
Patented Oct. 4, 1966

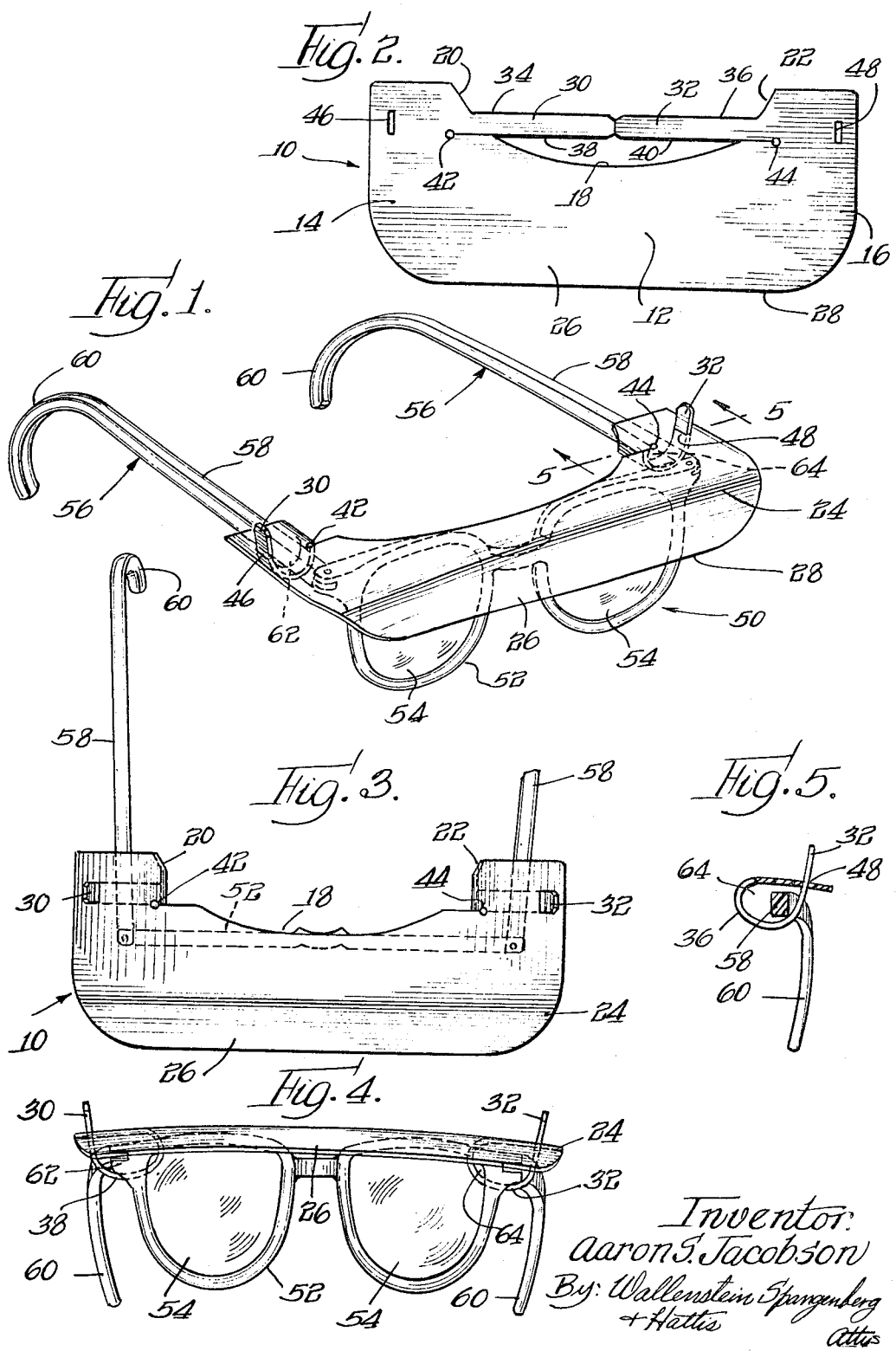

3,276,035
EYE SHIELD
Aaron S. Jacobson, 2221 W. Morse Ave., Chicago, Ill.
Filed Nov. 5, 1964, Ser. No. 409,058
4 Claims. (Cl. 2—13)

This invention relates to an improved eye shade of the type which is releasably attachable to eyeglasses.

Eye shades for attachment to eyeglasses have long been known. While generally reasonably effective for their intended purpose, they have certain disadvantages, especially from an economic standpoint. These economic considerations, in the main, relate to the number and character of the manufacturing operations required in their fabrication and to the need for cost-increasing auxiliary materials. Thus, for example, one form of heretofore known eye shades requires separate holding means in the form of elastic strands or cords which are retained in position on the eye shade with beads or buttons attached to the ends of the strands or cords. The strands or cords, through a separate operation, must thereafter be secured at one end to the body of the eye shade. While such cost-increasing factors seemingly are unimportant on a per item basis, when viewed in the light of a large-scale manufacturing operation, they assume significant proportions.

In accordance with the present invention, an improved eye shade is provided which simply, yet effectively, overcomes the disadvantages heretofore encountered in the fabrication of multiple component and material eye shades. Briefly, the eye shade of this invention comprises a unitary body having a central portion joined to rearwardly extending side portions. The side portions each advantageously have an elongated, flexible strip or strap-like portion integrally joined at one end to the inner margin of the side portions. The free end of each of the strap-like portions of the eye shade is adapted to be inserted into and drawn through an opening or slot in each of the side portions to form loops which encompass the hinged ear-engaging portions of the eyeglasses to which the eye shade is attached. The dimensions of the slots are such that the strap-like portions are snugly engaged therein thereby enabling the eye shade to be retained in a proper and secure position on the eyeglasses. The strap-like portions of the eye shade are formed in a manner to relieve stresses placed thereon as they are drawn through the slots in the side portions of the eye shade and thereby to substantially eliminate damage due to tearing of either the body of the eye shade or the strap-like portions thereof. The eye shade of this invention can be formed as a complete unit, from a single die stamping, ready for immediate use. The unitary construction of the eye shade of the present invention, together with the efficient simplicity of its design, make it exceedingly economical to manufacture, and easy to use.

These and other objects, advantages and features of the invention will manifest themselves upon making reference to the specification to follow, the claims and the accompanying drawing in which:

FIG. 1 is a view in perspective of an embodiment of the eye shade of this invention attached to conventional eyeglasses;

FIG. 2 is a plan view of said embodiment of the eye shade;

FIG. 3 is a plan view corresponding to the view of FIG. 1;

FIG. 4 is a front view in elevation corresponding to the view of FIG. 1; and

FIG. 5 is a sectional view taken substantially along line 5—5 of FIG. 1.

Referring now to the drawing, and in particular to FIG. 2 thereof, the embodiment of the eye shade of the present invention there illustrated and designated generally at 10 advantageously comprises a unitary body of flexible, semi-rigid material which may be cardboard, heavy paper, plastic, lightweight metal, or the like, especially a flexible plastic such as a vinyl plastic, having a central portion 12 joined to a pair of rearwardly extending side portions 14 and 16. The rear margin 18 of the central portion 12 and the inner margins 20 and 22 of the side portions 14 and 16 desirably are curved to conform with the normal curvature of the forehead of the wearer.

Added protection from light for the eyes of the wearer of the eye shade, without obstructing vision, can be attained by forming a permanent longitudinal crease 24 in the eye shade in a manner such that an area 26 of the eye shade between the crease 24 and the leading edge 28 of the eye shade is angled downwardly and lies in a plane lower than that of the remainder of the central portion 12 of the eye shade.

In achieving the objectives of this invention, the eye shade most advantageously is formed with a pair of elongated strip or strap-like portions 30 and 32 integrally joined at one end to respective side portions 14 and 16 at the inner margins 20 and 22 thereof. The rear margins 34 and 36 of the strap-like portions 30 and 32 desirably terminate at their juncture with the inner margins 20 and 22 of the side portions 14 and 16, while the inner margins 38 and 40, respectively, of the strap-like portions 30 and 32 advantageously terminate in openings 42 and 44 in the side portions 14 and 16 located inwardly of the inner margins 20 and 22 of the side portions 14 and 16. The function served by this arrangement will be made clear as the description proceeds.

The eye shade as illustrated further is provided with transverse openings or slots 46 and 48 desirably located proximal to the outer margin of the side portions 14 and 16, respectively. The slots 46 and 48 advantageously are of a size sufficient to enable the free ends of the strap-like portions 30 and 32 to be easily inserted into them and the strap-like portions to be drawn therethrough and yet to snugly retain the strap-like portions therein to secure the eye shade in proper position on the eyeglasses of the wearer.

The manner in which the eye shade of the present invention is utilized in connection with eyeglasses is manifest from FIGS. 1 and 3 through 5 of the drawing. As there illustrated, the eye shade 10 is attached to conventional eyeglasses 50 comprising a frame 52 carrying lenses 54—54, and a pair of hinged ear-engaging members 56—56 each having a straight portion 58, referred to in the trade as a temple, which is joined to a bowed portion 60. The eye shade may be attached to the eyeglasses 50 while they are being worn or by first removing them. In either event, the eye shade is attached to the eyeglasses by flexing the free ends of the strap-like portions 30 and 32 downwardly and then upwardly in a manner to enable the free ends thereof to be inserted into the slots 46 and 48. The portions 30 and 32 are drawn through the slots 46 and 48 to form loops 62 and 64 for receiving the ear-engaging members 56—56 of the eyeglasses. The size of the loops 62 and 64 may be varied by the wearer to accommodate the height and width of the straight portions or temples 58—58 of the members 56—56 and thus enable the eye shade to be properly and securely positioned on the eyeglasses. This selective adjustment of the size of the loops formed by the strap-like portions 30 and 32 can be made without damage, as by tearing, to the strap-like portions and the body of the eye shade, and is due to the above-described arrangement of the inner margins 38 and 40 of the portions 30 and 32 in relation to the openings 42 and 44. This arrangement enables the strap-like portions 30 and 32 to be drawn through the slots 46 and 48, respectively, a greater distance than would be possible if the inner margins 38 and 40 thereof terminated at their point of intersection with the curved inner margin 18 of the central portion 12. Tearing of the strap-like portions 30 and 32 at the terminus of their inner margins 38 and 40 in the side portions 14 and 16 is prevented by the openings 42 and 44 which act ot relieve damaging stresses placed on the strap-like portions 30 and 32 as they are drawn to their maximum extent through the slots 46 and 48. The construction of the eye shade of the present invention is not only simple thereby enabling it to be manufactured at minimal cost but is also rugged thereby providing the user with an eye shade which will give him maximum service while requiring minimum care.

It should be understood that various modifications may be made in the preferred embodiment of the invention described above without deviating from the broader aspects of the present invention.

What is claimed is:

1. An eye shade for releasable attachment to eyeglasses having hinged ear-engaging portions, comprising a unitary body having a central portion for engaging in overlying relation the frame of the eyeglasses and extending outwardly therefrom to provide shade for the eyes, a pair of rearwardly extending side portions joined to the central portion for engaging in overlying relation a segment of the hinged ear-engaging portions of the eyeglasses, elongated, flexible strip portions joined at one end to said side portions for engaging in underlying relation the hinged ear-engaging portions of the eyeglasses, and means in said side portions for snugly receiving the free ends of said strip portions for maintaining the eye shade on the eyeglasses.

2. An eye shade for releasable attachment to eyeglasses having hinged ear-engaging portions, comprising a unitary body having a central portion for engaging in overlying relation the frame of the eyeglasses and extending outwardly therefrom to provide shade for the eyes, a pair of rearwardly extending side portions joined to the central portion for engaging in overlying relation a segment of the hinged ear-engaging portions of the eyeglasses, and elongated, flexible strap-like portions joined at one end to said side portions for engaging in underlying relation the hinged ear-engaging portions of the eyeglasses, each of said strap-like portions having an inner margin terminating inwardly of the point of juncture of said one end of the strap-like portions with the side portions to enable the strap-like portions to resist potentially damaging stresses placed on said strap-like portions along said inner margin in the direction of their associated side portions.

3. An eye shade as claimed in claim 2 wherein the inner margins of the strap-like portions terminate in openings in the side portions.

4. An eye shade for releasable attachment to eyeglasses having hinged ear-engaging portions, comprising a unitary, single die cut body of flexible, semi-rigid material having a central portion for engaging in overlying relation the frame of the eyeglasses and extending outwardly therefrom to provide shade for the eyes, a pair of rearwardly extending side portions joined to the central portion for engaging in overlying relation a segment of the hinged ear-engaging portions of the eyeglasses, elongated, flexible strap-like portions joined at one end to said side portions for engaging the hinged ear-engaging portions of the eyeglasses, and transverse slots in the side portions for receiving the free ends of said strap-like portions to form loops encompassing a segment of said ear-engaging portions, said slots being of a size to permit the free ends of the strap-like portions to be inserted therein and the strap-like portions to be drawn therethrough for a portion of their length and to snugly retain said strap-like portions therein thereby to maintain the eye shade in proper and secure position on the eyeglasses.

References Cited by the Examiner

UNITED STATES PATENTS

| | | | |
|---|---|---|---|
| 2,541,242 | 2/1951 | Grove | 2—13 |
| 2,762,052 | 9/1956 | Bricker | 2—13 |
| 2,795,793 | 6/1957 | Sommers | 2—13 |
| 2,890,458 | 6/1959 | Hammond | 2—13 |
| 3,011,170 | 12/1961 | Lutz | 2—13 |

FRANK J. COHEN, *Primary Examiner.*

J. R. BOLER, *Assistant Examiner.*